Sept. 18, 1923.                E. F. STRATTON                1,468,088
                                  CAMERA
                            Filed April 25, 1922
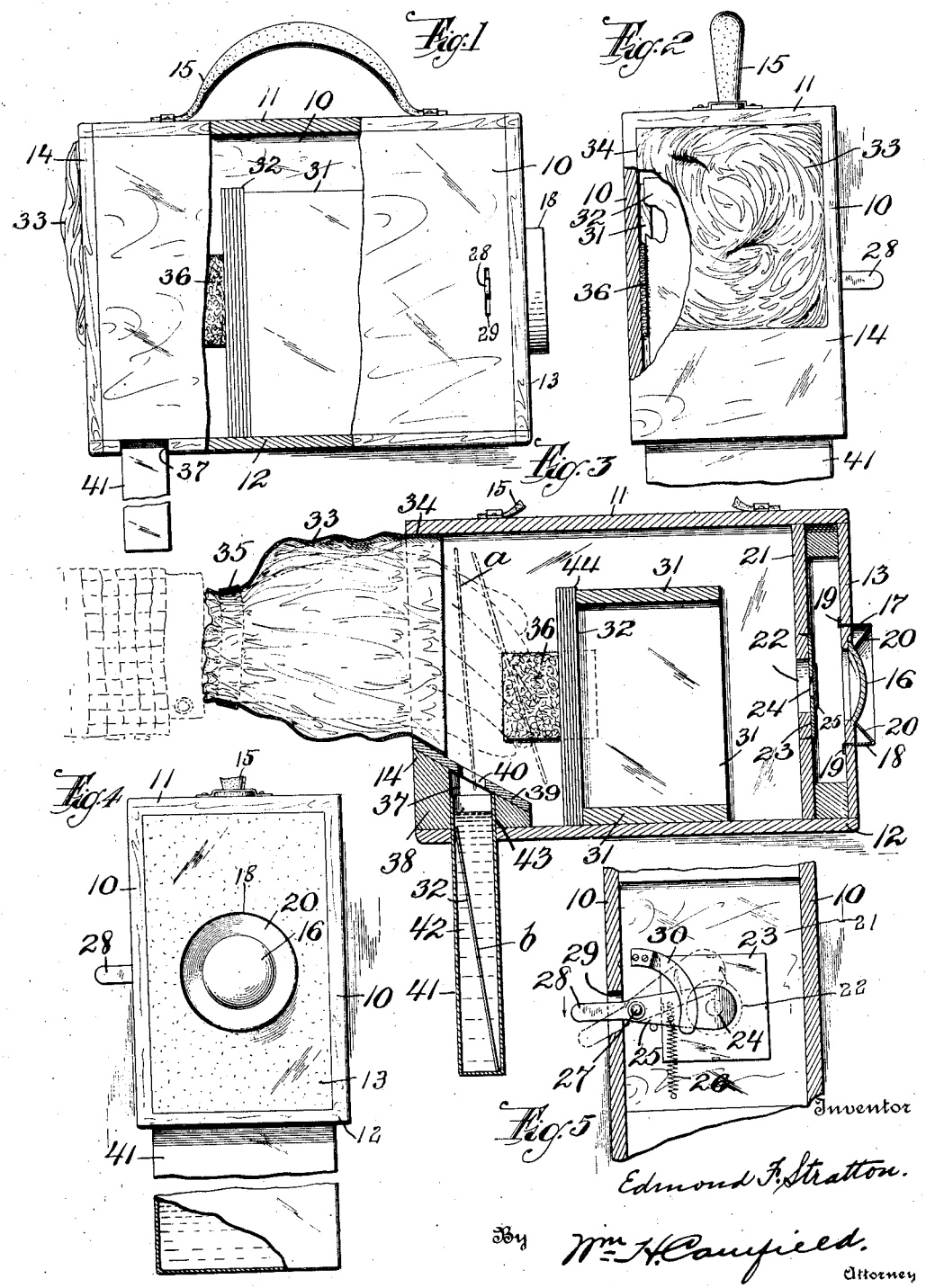

Patented Sept. 18, 1923.

1,468,088

UNITED STATES PATENT OFFICE.

EDMOND F. STRATTON, OF NEWARK, NEW JERSEY.

CAMERA.

Application filed April 25, 1922. Serial No. 556,446.

*To all whom it may concern:*

Be it known that I, EDMOND F. STRATTON, a citizen of the United States, and a resident of Newark, county of Essex, and State of New Jersey, have invented certain new and useful Improvements in Cameras, of which the following is a specification.

This invention relates to an improved camera which can be economically manufactured and which provides for the exposure and development of a sensitized sheet of either cardboard or metal to produce a photograph, and is particularly designed to provide an improved means for holding the sensitized sheet in position in the focal plane of the lens of the camera and also to permit its manipulation so that it can be deposited in a tank which holds the developing and fixing bath.

The invention further resides in certain details of construction which will be hereinafter more fully described and finally embodied in the claims.

The invention is illustrated in the accompanying drawing, in which Figure 1 is a side view with part of the casing broken away. Figure 2 is a rear view with part of the casing broken away. Figure 3 is a central vertical section through the camera. Figure 4 is a front view of the camera, and Figure 5 is a detail showing the shutter mechanism in elevation.

The camera comprises a casing which is usually made of wood, which casing comprises sides 10, a top 11, a bottom 12, a front wall 13 and a back 14. Any suitable handle, such as the handle 15, can be secured to the casing for carrying it. The front wall 13 is provided with a lens 16, this front wall being usually made of heavy cardboard, although other material can be employed, and is slightly recessed, as at 17, to receive the edge of the lens.

The rim 18, usually of metal, is secured to the front face of the front wall 13 and is fastened in position by suitable means, as, for instance, the prongs 19 which can be struck up from the same sheet of metal. The rim has an inwardly turned flange 20, this flange engaging the outer face of the lens near its edge and holding it in position, preventing lateral movement thereof and holding it tightly clamped against the front wall. The rim usually projects far enough to the front of the lens to protect it from contact with surfaces against which the camera might be pressed or knocked.

A supplemental front wall 21 is placed directly in rear of the front wall 13 and has an opening 22 so that light passing through the lens can enter the chamber within the camera, and on the front of this opening I arrange a diaphragm 23 with a suitable opening 24 in it, and the shutter 25 is normally held by the spring 26 to close the opening 24 in the diaphragm, the shutter being pivoted, as at 27, and its end projects to form a handle 28 on the outside of the camera, the handle being movable as it projects through a slot 29 in one of the side walls, the shutter being held in contact with the diaphragm during its travel by reason of the flat spring 30 bearing against it.

A positioning means for sensitized sheets is provided at a proper distance from the lens, and in the form shown it consists of a box-like casing 31 which is glued or otherwise secured in the main casing, and at its rear edge it is adapted to receive a sensitized sheet 32, this sheet being an ordinary tintype or any other form of sensitized cardboard on which the photograph is to be developed, and the usual way is to place a half dozen of these sheets in the camera at the same time, although, if desired, they can be placed therein one at a time.

In order to place the sheet in position an open-ended sleeve 33 is arranged in the opening 34 in the back wall 14 of the camera, the outer end of the sleeve having an elastic band 35 on it so that it can be placed over the wrist of the person operating the camera and be held tight against it to prevent the entrance of light and to also serve, when the hand is withdrawn, to close the mouth of the sleeve, thus at all times preventing light from entering at this end, the sleeve 33 being usually made of fabric that is black, at least on the inside, the inside of the camera, of course, being treated as they usually are by having a coating of black paint on the inside walls.

In order to hold the sensitized sheet or sheets 32 in position I hold them by their edges against a frictional surface so that they can be readily put in place and just as readily removed therefrom, such frictional surface being shown in the drawing on the two side edges and embodied in the strips 36, preferably one on each side of the casing, on the inner faces of the side walls 10 and about half way up at the place where the sheets will be in position so that they are held substantially flat. A good material for these strips is velvet or velveteen, rough felt, soft rubber or similar material with a resilient or fibrous face into which the edge of the sheet can be slightly embedded when it is in position, but it does not in any sense resist removal or insertion.

In back of the positioning means the casing is provided with a slot 37 arranged in the block 38 and extending substantially the whole distance between the side walls 10, and a plate 39 has a slit 40 substantially central of the slot 37 and extending likewise substantially all the way across the camera between the side walls so as to receive the sensitized sheet 32, giving it a material clearance on each side edge. The tank 41 is wide and flat and is deep enough to receive one of the sensitized sheets so that it is submerged in the developing and fixing bath 42 in the tank. The tank is proportioned so that the top parts 43 of the walls fit tightly in the slot 37 and the tank is thus held in place by friction, being readily removable, as will be evident.

The operation of the device is as follows:
A package of sensitized sheets is carried by the hand into the sleeve 33. If it is in the daylight the wrapper is removed by the hand after the sheets are inside the sleeve, and the sheets are then held between the fingers at the top part of the side edges so that they are evenly pressed against the bottom of the camera and against the positioning means 31, and then by a pressure of the hand against the center of the package of sheets, or a single sheet if only one is in the camera, they are pressed as shown in Figure 3, that is, against the positioning means, being easily brushed past the resilient surface or face of the strips 36, the positioning means 31 having its back end thereby forming a frame against which the foremost sheet rests, the positioning means being a little lower than the sheet so that the top edge of the sheet, as at 44, can be engaged by the finger to pull it back when desired.

When the sheets are in position as above described, the sheet resting against the positioning means is in the focal plane of the lens 16, and then the shutter is operated to expose the sheet and it is now ready for development. The package of sheets is swung back at their top edges with their bottom edges acting as a fulcrum on the bottom of the camera, and the foremost sheet is slid off the pack, the pack is then pushed into position by either the bottom edge of the sheet just extracted or by a finger of the hand, and the sensitized sheet so selected is now ready to be dropped through the slit 40 and the slot 37 into the tank 41. The slot is easily found by running the bottom of the sheet or card along the inclined face of the plate 39 until it snaps into the slit 40. The descent of the card is easy because the strips 36 with their frictional surfaces do not run back far enough to interfere, being terminated in front of the slot 37, and there is, therefore, no obstruction to the card or sheet 32 descending by gravity from the position shown at *a* in Figure 3 to the position shown at *b* in the same Figure.

The hand can now be withdrawn from the sleeve 33, and after the proper time has elapsed the tank 41 is pulled out from the bottom of the camera and the developed and fixed photograph withdrawn from the tank. When the hand is withdrawn from the sleeve 33, the material of the sleeve is bunched together and pushed into the opening in the back wall of the camera, as shown in Figures 1 and 2, and when so pushed in projects inwardly above the slit 40, therefore eliminating the chance of any light entering the camera through this slit when the tank 41 is withdrawn.

It will be evident that minor changes can be made in this construction without departing from the scope of the invention.

I claim:

1. A camera comprising a casing having exposure means, positioning means for holding a sensitized sheet in the focal plane of the exposure means, said positioning means holding said sheet only at its edges and only by friction.

2. A camera comprising a casing having exposure means, positioning means for holding a sensitized sheet in the focal plane of the exposure means, said positioning means including strips of material with friction surfaces for engaging edges of the sheet.

3. A camera comprising a casing having exposure means, positioning means for holding a sensitized sheet in the focal plane of the exposure means, said positioning means including strips of material with friction surfaces for engaging edges of the sheet, said means being disposed so as to leave one edge of the sheet projecting so that the sheet can be manipulated.

4. A comera comprising a casing, exposure means including a lens on one end of the casing, a stop against which a sensitized sheet can be set so as to be in the focal plane of the lens, and friction strips on opposite sides of the casing to hold the sensitized sheet in place against the stop and permit its ready removal therefrom.

5. A camera comprising a casing, exposure means including a lens on one end of the casing, a stop against which a sensitized sheet can be set so as to be in the focal plane of the lens, friction strips on opposite sides of the casing to hold the sensitized sheet in place against the stop and permit its ready removal therefrom, the casing having a slot in the bottom in rear of the stop, and a tank to receive the sheet through the slot, the tank being held in place by the frictional contact of its top portion with the walls of the slot.

6. A camera comprising a casing, exposure means including a lens on one end of the casing, a stop against which a sensitized sheet can be set so as to be in the focal plane of the lens, friction strips on opposite sides of the casing to hold the sensitized sheet in place against the stop and permit its ready removal therefrom, the casing having a slot in the bottom in rear of the stop, a tank to receive the sheet through the slot, the tank being held in place by the frictional contact of its top portion with the walls of the slot, a plate at the top of the slot, the plate having a slit therein, and a flexible open-ended sleeve in the rear of the casing and providing for access thereto, the sleeve when stuffed into the rear end of the casing acting to prevent light entering the casing through the slit.

7. A camera comprising a casing having a slot in the bottom, and a tank to fit the slot and adapted to be held in place by the frictional contact of the top portion of the tank with the walls of the slot.

8. A camera comprising a casing, a block at the rear portion of the casing and at the bottom thereof, the casing and the block having a slot therein, and a tank having its top portion proportioned so that it fits tightly in the slot, whereby the tank is held solely by the friction of said top portion with the walls of the slot.

In testimony that I claim the foregoing, I have hereto set my hand, this 21st day of April, 1922.

EDMOND F. STRATTON.